Inventor
Alexander Boller

Feb. 7, 1933. A. BOLLER 1,896,477
BACK SEAT FOR AUTOMOBILES
Filed July 17, 1929  2 Sheets-Sheet 2
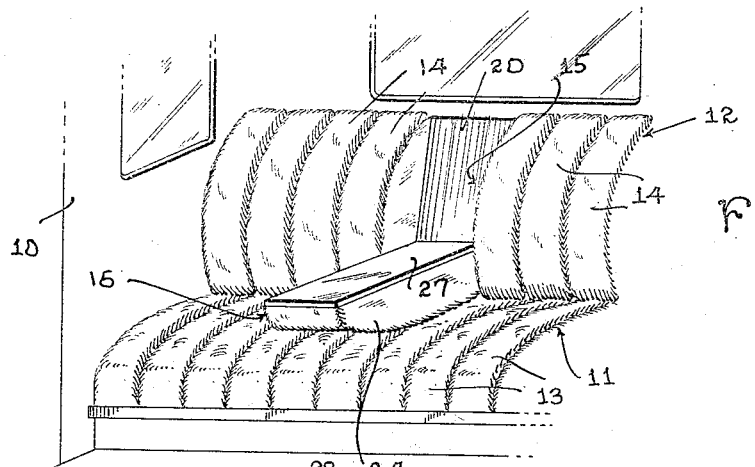
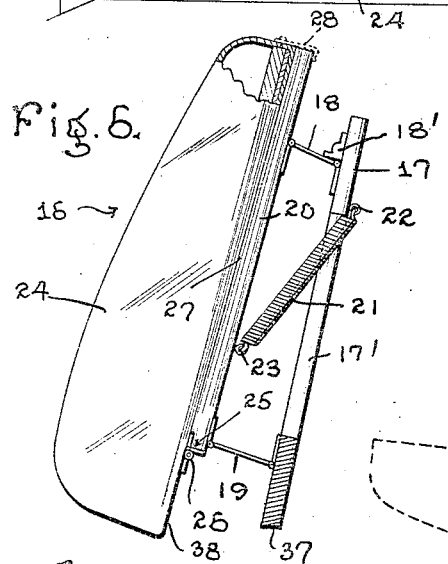
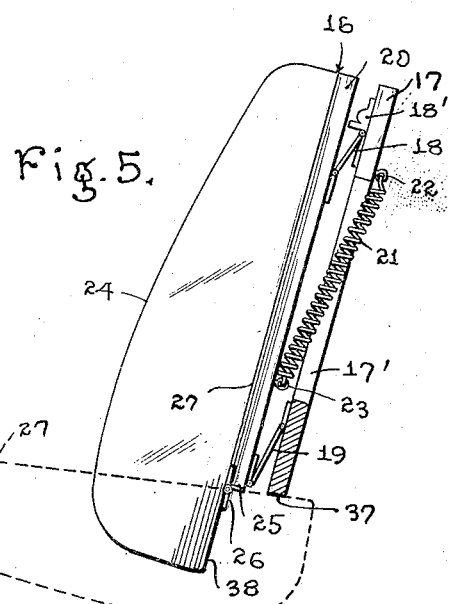
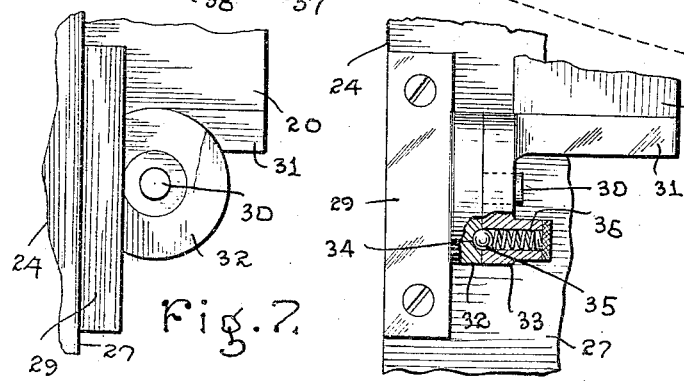
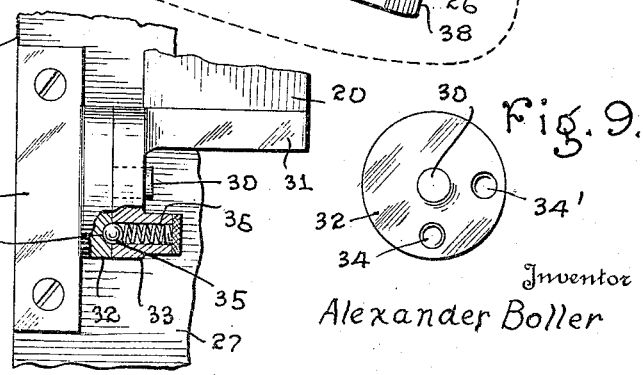
Inventor
Alexander Boller
By J. P. Bassiches
his Attorney Patented Feb. 7, 1933

1,896,477

UNITED STATES PATENT OFFICE

ALEXANDER BOLLER, OF NEW YORK, N. Y.

BACK SEAT FOR AUTOMOBILES

Application filed July 17, 1929. Serial No. 378,988.

This invention relates to automobile body construction; more particularly, to a seat construction of the automobile body. It is an object of my invention to associate with a seat suitable for a plurality of sittings, particularly the back seat of an automobile, an auxiliary attachment arranged to be associated with the seat, which may be forwardly disposed, to provide seating space for more than two passengers in staggered or offset relation, whereby three passengers may be seated, each provided with back supports, leaving the shoulders of the passengers unconfined.

It is contemplated by my invention to associate with the seat of an automobile which may comfortably seat two passengers, an auxiliary section in the nature of a back, capable of being projected forwardly, combining with the seat normally provided to obtain a seating space for a third person who is positioned in a manner to leave three passengers in a comfortable position, with the back supporting portion offset to leave the shoulders of all passengers free and unconfined. It is still further contemplated by my invention to provide in combination with a seat of an automobile which may be aranged for a plurality of sittings, such as for two passengers, an auxiliary section which may be changed to provide either an auxiliary back for the seat where three passengers may be seated comfortably or, under other circumstances whereby the auxiliary section may be converted into an arm rest, substantially centrally of the seat.

It is still further an object of my invention to associate with the seat of an automobile or the like, an auxiliary section substantially centrally thereof which may be converted either into an auxiliary back to comfortably position three passengers in stepped or offset position or to provide the back seat with an arm rest.

It is still further contemplated by my invention to provide, in combination with the seat of an automobile suitable for a plurality of sittings, mounting means for an auxiliary section, the auxiliary section serving either as an auxiliary back, to permit three persons to be seated in a comfortable position, characterized by seating the passengers in offset or staggered relation, preferably in such relation that the center passenger is positioned forwardly of each adjacent passenger, the mounting means being further capable of converting the auxiliary section into an arm rest substantially centrally of the back seat, or capable of disposing the auxiliary section substantially in the plane of the back of the automobile seat.

A still further object of my invention resides in the provision of an automobile body construction comprising a seat suitable for a plurality of sittings, including an auxiliary section and mounting means therefor which will dispose the auxiliary section to conform in general appearance to the normal upholstered surface of an automobile seat, and being capable of disposing the section forwardly of the common back, to provide seating space for a passenger positioned forwardly of adjacent passengers or to optionally convert the auxiliary section into an arm rest where one or two passengers occupy such seat.

Still further objects of my invention reside in the provision of an automobile body construction including the seat thereof arranged for a plurality of sittings and mounting means for an auxiliary section of simple design and inexpensive construction, to serve either to enlarge the comfortable seating capacity of the seat or to be converted into an arm rest, without detracting from the appearance of the upholstering.

To attain these objects and such other objects as may appear herein or be hereinafter pointed out, I make reference to the accompanying drawings forming a part herein, in which Figure 1 is a fragmentary perspective view of the rear seat of an automobile embodying my invention;

Figure 4 is a perspective view of the back seat, with the attachment tilted forwardly in an arm rest position;

Figure 5 is an enlarged detail in side elevation of the attachment assembly;

Figure 6 is a similar view, fragmentary in part, with the attachment in another position;

Figure 7 is a fragmentary enlarged detail of the hinge construction;

Figure 8 is a fragmentary frontal elevation of the same;

Figure 9 is an enlarged frontal view of a hinge plate shown in Figures 7 and 8.

Figure 1:
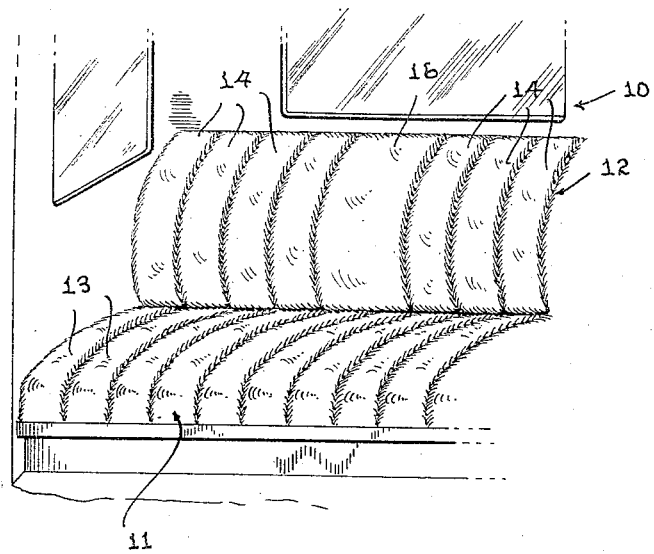

Making reference to the drawings, my invention is preferably embodied with the back seat of an automobile 10, having the seating cushion 11 arranged for a plurality of sittings and a common back cushion assembly 12 of equal width. Both the seat cushion 11 and the back 12 have the customary upholstering arranged in rows 13 and 14 on the seat and back respectively. Disposed substantially centrally and between inner extreme rows of upholstered material 14, which preferably is centrally located on the back 12, the upholstering material is omitted at 15 and within this space there is inserted an auxiliary cushion assembly 16. This comprises a rear panel 17, which is arranged to lie at the back, substantially in line with the back of the body supporting the cushions 14. The panel 17 has a pair of double throw hinges 18 and 19 affixed adjacent the upper and lower edges of the panel 17 and to the double hinges thus described there is affixed an intermediate panel 20. The intermediate panel which is connected as above described with the rear panel 17 may, by reason of the double throw hinges provided, move to either the aligned position shown in Figure 5 or to the distended position shown in Figure 6. These sections are connected by a coiled spring 21, the free ends of which are connected at 22 and 23 by eyelets affixed to the panel and intermediate panel 17 and 20, respectively. The coiled spring 21 is so adjusted in reference to the intermediate panel 20 that when the hinges are off the dead center the coiled spring 21 will draw the intermediate panel to the aligned position shown in Figure 5 or to the distended position shown in Figure 6. Upward movement beyond the position shown in Figure 6 is prevented by the stop 18', engaging the central leaf of the hinge 18, to thereby hold the panel 20 spaced from the panel 17 to the fullest distended position. This is also locked in reference to lateral pressure which may be placed upon the panel 20 so that it is in an off center position and will act as a stop as long as the lateral pressure continues, either by reason of the coiled spring 21 or otherwise, as will appear more clearly as this description proceeds. Thus, only downward pressure upon the panel 20 and any assembly which it may carry will serve to realign this with the rear panel 17 past the dead center of the central leaves of the hinges 18 and 19, whereupon the coiled spring 21 will then serve to draw the panel 20 in the aligned position with the panel 17. For purposes of permitting the panels 17 and 20 to lie in substantially close contact and provide space for the coiled spring 21, the panel 17 is provided with a central aperture 17' for substantially the full length of the coiled spring 21.

Figure 2:
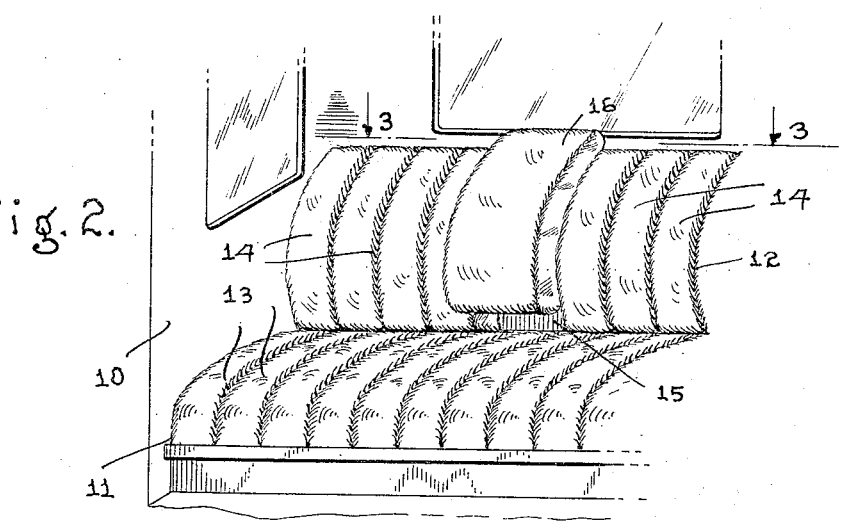
Figure 2 is a similar view with the attachment disclosed serving as a back.
Figure 3:
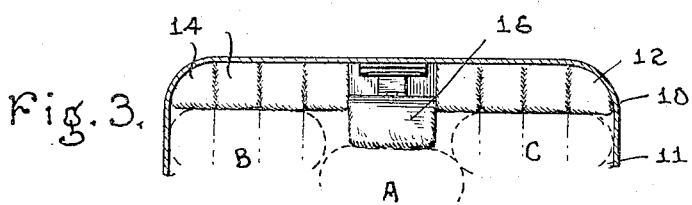
Figure 3 is a section taken on the line 3—3 of Figure 2.

Frontally of the intermediate panel 20, there is provided a cushion member 24 which is affixed to the intermediate panel 20 at the lower edge 25 by a hinge 26, connecting the cushion at the rear face 27. The hinge 26 may be of the simple door type, in which event the panel 20 and cushion 24 are maintained in the locked position by a latch shown in dotted line in Figure 6 at 28. This latch, however, may be omitted and in such event the hinge as shown in Figures 7, 8 and 9, is preferably used, wherein the hinge plate 29, carrying the pintle 30, is affixed to the rear face 27 of the cushion 24 and the pivot plate 31 is affixed to the panel 20. The plate carrying the pintle and the pivot plate 31 have contacting faces at 32 and 33, respectively. The plate 32 has a plurality of notches 34 and 34', which may align with the spring pressed ball 35, carried by the pivot plate 31 in the orifice 36, forming the casting thereof. In this manner, by the hinge construction provided, the ball will fall in either of the apertures 34 and 34', depending upon the relative pivotal position assumed by the plates 32 and 33, to thereby hold these plates in fixed position against accidental and free pivotal movement. By the construction provided, the cushion 24 may be disposed optionally either flush with the back 12, as shown in Figure 1, or disposed forwardly, as shown in Figure 2 and by the hinge construction as shown, I may provide a full length cushion cooperating with the common seat 11, serving as a back for an individual (A) who may be seated forwardly of individuals (B) and (C), shown in Figure 3, in staggered or off-set position, with a back and shoulder support for the full length of the back of the individual (A), including his shoulder, thereby providing comfortable seating for three individuals whereas previously, within the limits of the entire width of the seat 10, only two individuals may be comfortably seated. The forward disposition of the central auxiliary section also leaves free and unconfined the shoulder supporting portion of the cushions 14, 14 and the auxiliary cushion 24. It is preferred that the central leaves of the hinges 18 and 19 are of a length to dispose the cushion 24 sufficiently forward as to correspond to substantially the depth of the body, particularly at the chest and shoulders, to give full freedom to the arms and shoulders of the individuals (B) and (C), seating adjacent the individual (A) and for this purpose, the cushion may be disposed forwardly for a distance of 4 to 6 or more inches, the distance being within limits such as to give freedom to the arms of all the passengers, and also their shoulders, and still, at the same time, making the common seat cushion available for all three passengers without modification.

However, where the rear seat 10 is to be occupied by one or two individuals, without requiring the use of the auxiliary cushion 24, this may optionally be tilted forwardly, as shown in Figure 4, about the hinge 26, to thereby expose the surface 27 in substantially the horizontal position. This is preferably accomplished when the intermediate panel 20 is in aligned position with the panel 17, to thereby serve to provide a stop or abutment 37 for the inner edge 38 of the cushion, preventing undue downward tiltable position. The relative position of the parts is as shown in Figure 4 and in Figure 5 in dotted line. The cushion 24 may optionally, however, rest upon the seat cushion 11 and derive the resiliency due to resting thereon. In this position, passengers sitting to each end of the seat are provided with arm rests, thereby providing an additional element of comfort when the entire seat need not be utilized to seat three passengers.

It will thus be observed that I have provided an auxiliary attachment for an automobile body wherein a seat may be used for a plurality of sittings, not only for small persons, but wherein three or more substantially large individuals may be seated with considerable comfort, without undue crowding or uncomfortably confining the shoulders and arms, when in the sitting position. Also, the auxiliary attachment may optionally be varied to provide an arm rest where it is only necessary to seat one or two persons.

Having thus described my invention and illustrated its use, what I claim as new and desire to secure by Letters Patent, is—

1. In an automobile body construction, in combination with a seat suitable for a plurality of sittings, of an auxiliary section arranged to be disposed in the plane of the back of said seat, mounting means for said section for bodily disposing said section forwardly of the plane of the back of said seat, providing within limits free and unconfined shoulder back supporting portions for three passengers, said mounting means including means for tilting said section out of the plane of said back to dispose said section in a position serving as an arm rest.

2. In an automobile body construction, in combination with a seat suitable for a plurality of sittings, an auxiliary section substantially centrally disposed in relation to said seat, mounting means for said section to forwardly project the section bodily, providing within limits a back, to dispose three passengers in staggered or offset sitting position, with their shoulder supporting back portion free and unconfined and means for tilting said section to form an arm rest when said mounting means is in the plane of the common back of said seat.

3. In an automobile body construction, in combination with a seat suitable for a plurality of sittings, of an auxiliary upholstered section substantially centrally disposed from the back thereof, an intermediate member normally in the confines of said back for supporting said section, mounting means for said intermediate member to bodily project the same from the confines of the back or retract the same into the confines of said back, said intermediate member including hingeable means for the upholstered section to independently tilt the same into a position providing an arm rest substantially centrally of said seat.

4. In an automobile body construction, in combination with a seat and back construction suitable for a plurality of sittings, of an auxiliary section arranged to be disposed in a space provided in the back of said seat, substantially centrally thereof, said section comprising a cushion member and a supporting panel associated with said back construction, mounting means for said member having pivotal connection with said back construction, and said supporting panel whereby said cushion may be forwardly projected the assembly providing within limits at least three seats with unconfined shoulder supporting back portions or forwardly tilted relatively to said panel serving as an arm rest for passengers to each side of said section.

5. In an automobile body construction, in combination with a seat and back construction suitable for a plurality of sittings, of an auxiliary section arranged to be disposed in a space provided in the back of said seat, substantially centrally thereof, said section comprising a cushion member and a supporting panel associated with said back construction, mounting means for said member having pivotal connection with said back construction, and said supporting panel whereby said cushion may be forwardly projected the assembly providing within limits at least three seats with unconfined shoulder supporting back portions or forwardly tilted relatively to said panel serving as an arm rest for passengers to each side of said section, said panel having an extended portion to provide a stop, engaging said cushion to limit the forward or tiltable movement of said cushion.

6. In an automobile body construction, in combination with a seat suitable for a plurality of sittings, an auxiliary section of substantially the same contour as the back, disposed between and substantially centrally of said back, said auxiliary section comprising a cushion member, mounting means for said cushion member, said mounting means including hinges for said cushion member mounting said member to be forwardly projectable, and tiltable substantially horizontally whereby said cushion member may serve either as an auxiliary back when forwardly projected, serving to provide within limits at least three unconfined shoulder supporting backs for passengers or the same may be moved to a tilted position to form a centrally disposed arm rest.

7. In an automobile construction, a seat suitable for a plurality of sittings, an auxiliary section arranged to be disposed substantially in the plane of the back of said seat and substantially centrally thereof, comprising hinged mounting means for forwardly tilting the same in an arm rest position and an additional hinge mounting whereby said section may be disposed forwardly from the plane of the back, the assembly providing within limits at least three seats with unconfined shoulder supporting portions.

8. In an automobile construction, in combination with a seat suitable for a plurality of sittings, an auxiliary section comprising a cushion member, arranged to be disposed within the plane of the back, mounting means therefor including a member having movement to project said cushion member forwardly of the plane of the back, providing within limits unconfined shoulder supporting backs for at least three passengers, said mounting means including hingeable means for forwardly tilting said cushion member into an arm rest position.

In witness whereof I have hereunto signed my name this 12th day of July, 1929.

ALEXANDER BOLLER.